UNITED STATES PATENT OFFICE.

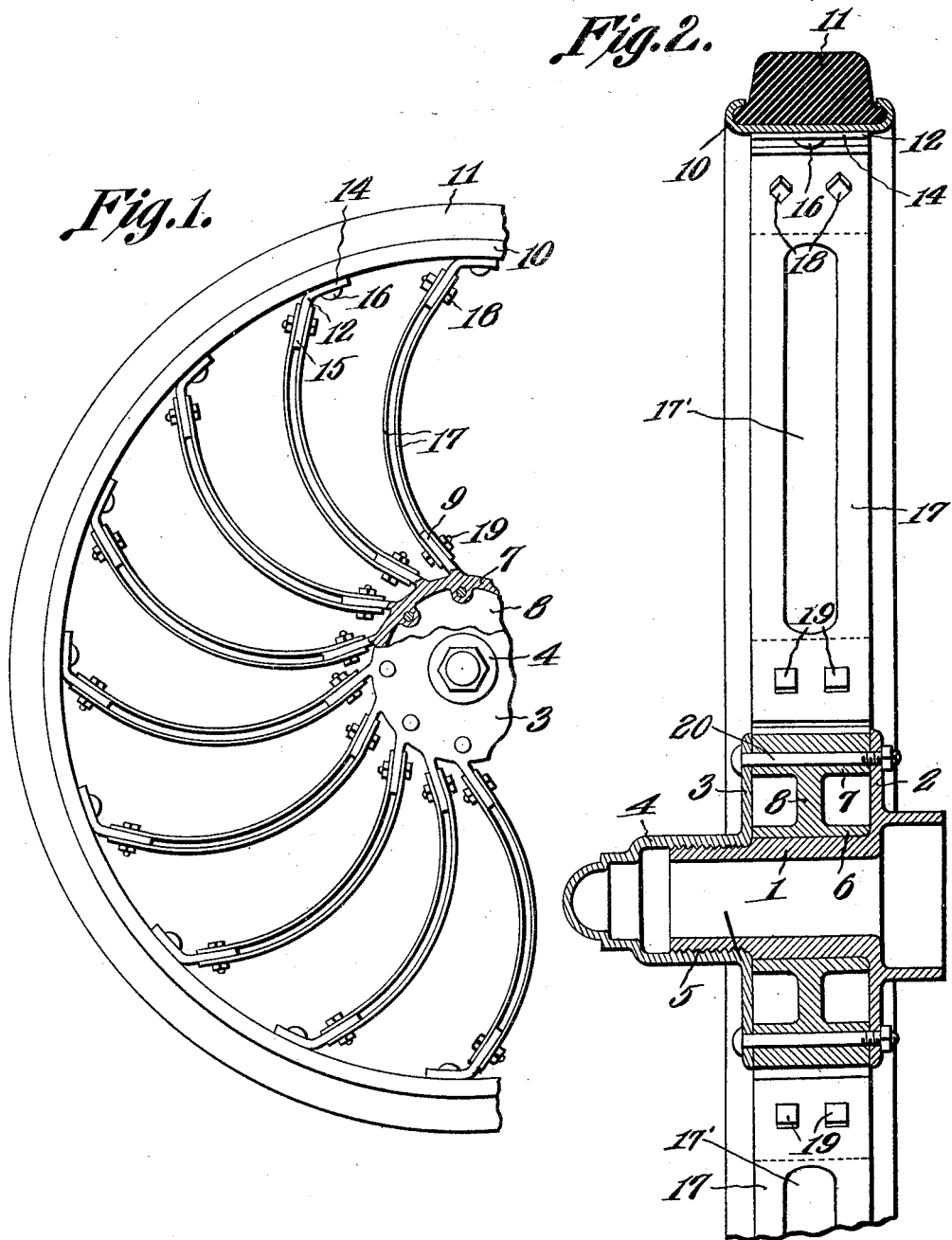

THOMAS N. JORDAN, OF LONG BEACH, MISSISSIPPI.

SPRING-WHEEL.

1,103,295.  Specification of Letters Patent.  Patented July 14, 1914.

Application filed December 2, 1913. Serial No. 804,230.

*To all whom it may concern:*

Be it known that I, THOMAS N. JORDAN, a citizen of the United States, residing at Long Beach, in the county of Harrison and State of Mississippi, have invented a new and useful Spring-Wheel, of which the following is a specification.

The device forming the subject matter of this application is a spring wheel of novel form.

One object of the invention is to provide, in a spring wheel, an auxiliary hub of novel construction.

Another object of the invention is to provide a spring spoke of novel form.

The invention aims further to provide novel means for assembling the outer ends of the spoke with the rim.

It is within the scope of the invention to provide a spring wheel comprising an auxiliary hub which may be slipped readily over the hub of a wheel of standard construction.

The invention aims to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 shows in side elevation, a portion of a wheel constructed in accordance with the present invention, parts being broken away; Fig. 2 is a fragmental diametrical section of the structure shown in Fig. 1.

In the drawings, the numeral 1 indicates a tubular hub provided at its inner end with a fixed side plate 2. The invention further includes a removable side plate 3 surrounding the tubular hub 1 and provided with a neck 4 which is threaded as indicated at 5 upon the outer end of the tubular hub 1.

Surrounding the tubular hub 1 is an auxiliary hub, the same being fashioned from metal and comprising, in a one piece structure, an inner ring 6, an outer ring 7 which is thicker than the inner ring 6, a reduced web 8 connecting the rings 6 and 7, and lugs 9 which outstand from the outer ring 7 and define acute angles with the radii of the outer ring 7.

The invention further includes a rim 10 which may be of any form, the same supporting a tire 11. Lugs or brackets 12 are provided, each lug or bracket 12 comprising an arm 14 and an arm 15, the arms 14 and 15 of the brackets being disposed at an obtuse angle to each other, and the arms 15 of the brackets standing at an obtuse angle to the lugs 9 of the hub. By means of securing elements 16, the arms 14 of the brackets are secured to the rim 10. The lugs or brackets 12 ordinarily are fashioned from metal.

The invention includes resilient metallic spokes 17. These spokes 17 are disposed in pairs, the spokes of each pair being alined circumferentially of the wheel, and the spokes of each pair being bowed, all of the spokes being bowed in a common direction, circumferentially of the wheel. The spokes 17 of each pair are applied to the opposite faces of the lug 9 and the arm 15 of the lug or bracket 12. Securing elements 18 unite the outer ends of the spokes 17 of each pair with the arms 15 of the bracket 12 and securing elements 19 unite the inner ends of the spokes 17 of each pair with the corresponding lug 9 on the hub. Each leaf or spoke 17 is longitudinally slotted as indicated at 17'. This slot in the spoke is of importance, since it causes the resiliency to take place at the proper point in the spoke and, further, owing to the provision of the slot 17' the material is disposed in the most advantageous manner to resist lateral flexure. By changing the leaves or spokes the resiliency of the wheel may be adjusted readily.

The rings 6 and 7 of the auxiliary hub are of the same width so that the plates 2 and 3 of the main hub will bear against the edges of both rings at once. In this connection it is to be noted that the original auxiliary hub may be slipped readily off the main hub 1 and be replaced by the auxiliary hub shown clearly in the drawings and constituting a part of the present invention. After the side plates 2 and 3 have been positioned with respect to the auxiliary hub as shown in Fig. 2 of the drawings, securing elements 20 which may be bolt and nut structures, are passed through the removable side plate 3, through the thicker, outer ring 7 of the auxiliary hub and through the fixed side plate 2.

Owing to the fact that the auxiliary hub comprises in a one piece structure, the inner ring 6, the connecting web 8, the outer ring 7 and the lugs 9, this hub may be fashioned cheaply, and expensive machine work is avoided. Owing to the fact that the reduced or thinned web 8 is provided, the necessary strength is secured with a minimum expenditure of material. Further, owing to the fact that the auxiliary hub includes the reduced web 8, annular chambers are formed upon opposite sides of the web, which chambers are adapted to receive projections and the like which may occur upon the inner faces of the side plates 2 and 3, it being one object of the invention to provide an auxiliary hub and attendant parts which may be readily mounted upon any of the main tubular hubs now constituting a part of the vehicle wheels.

The specific form of spoke shown and described will be found thoroughly efficient to afford the necessary resiliency combined with the necessary ability to resist a lateral flexure, the spokes 17 preferably being in the form of flat plates of greater width than thickness, thereby to afford the necessary yielding, circumferentially of the wheel, but to avoid a yielding transversely of the wheel.

Having thus described the invention, what is claimed is:—

In a spring wheel, a rim provided with a lug; a hub provided with a lug, the lug of the hub and the lug of the rim extending in a common direction, circumferentially of the wheel, and defining an angle with respect to each other; and parallel spokes secured to the opposite faces of the lugs, the spokes being alined, circumferentially of the wheel, and being arched, circumferentially of the wheel.

In testimony that I claim the foregoing as my own, I have hereto affixed my signature in the presence of two witnesses.

THOMAS N. JORDAN.

Witnesses:
J. L. WYATT,
T. W. MILUED.

---

Copies of this patent may be obtained for five cents each, by addressing the "Commissioner of Patents, Washington, D. C."